Sept. 9, 1969     H. J. BARCHI ET AL     3,465,384
APPARATUS FOR REGISTRATION OF PLASTIC WEB
Filed Feb. 8, 1967     9 Sheets-Sheet 1
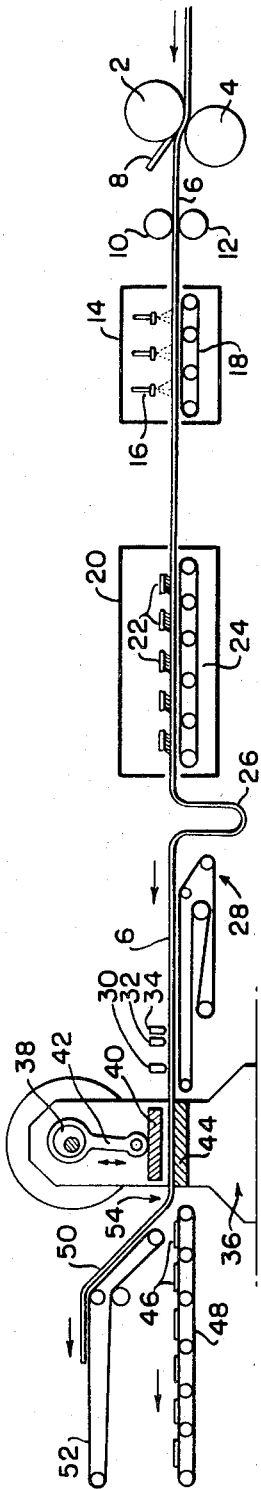
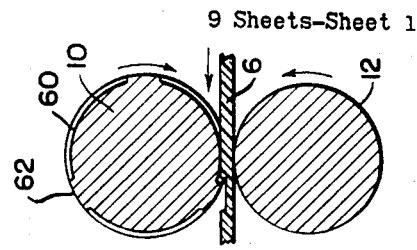
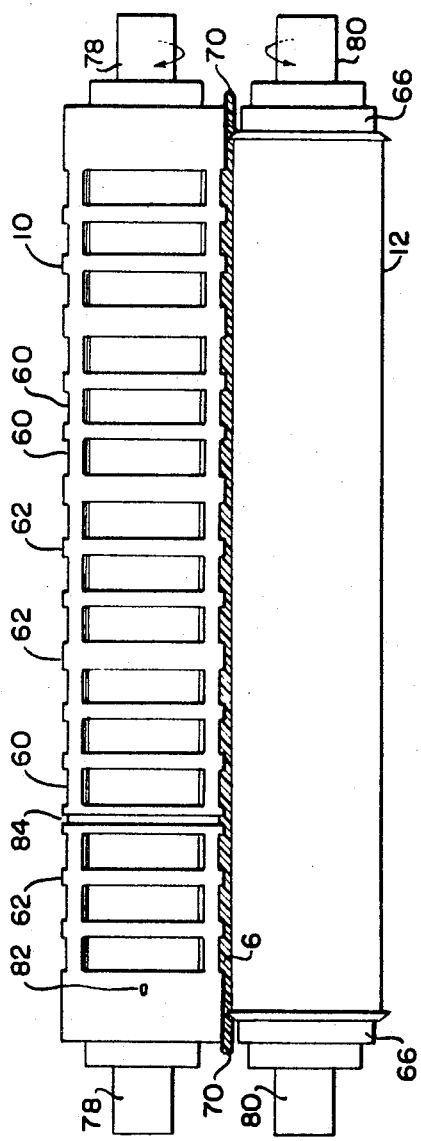
INVENTORS
HENRY J. BARCHI
DONALD C. FERGUSON
MERRILL M. SMITH
BY Kenway, Jenney + Hildreth
ATTORNEYS

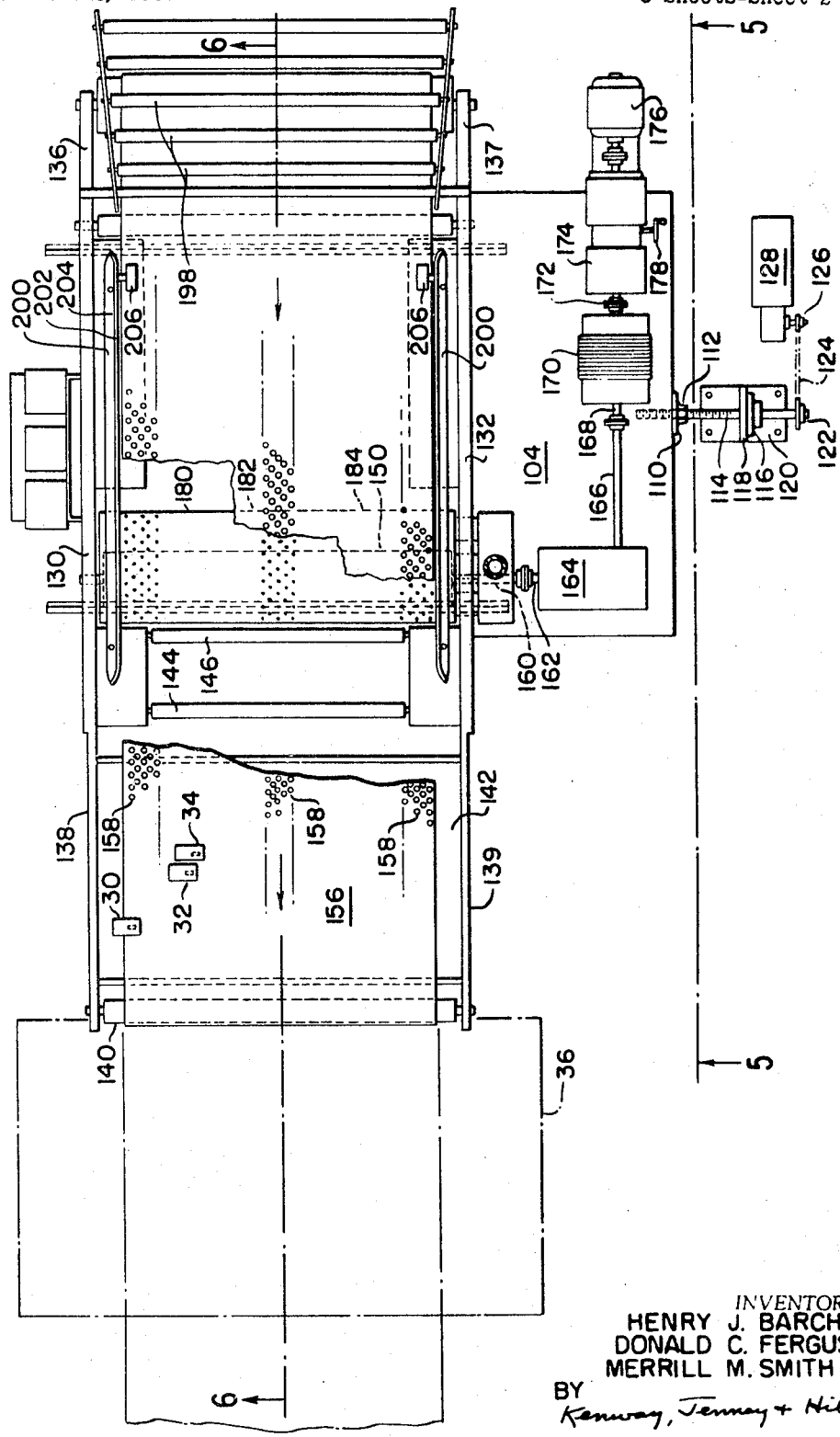

Sept. 9, 1969  H. J. BARCHI ET AL  3,465,384
APPARATUS FOR REGISTRATION OF PLASTIC WEB
Filed Feb. 8, 1967  9 Sheets-Sheet 3

INVENTORS
HENRY J. BARCHI
DONALD C. FERGUSON
MERRILL M. SMITH
BY
Kenway, Jenney + Hildreth
ATTORNEYS

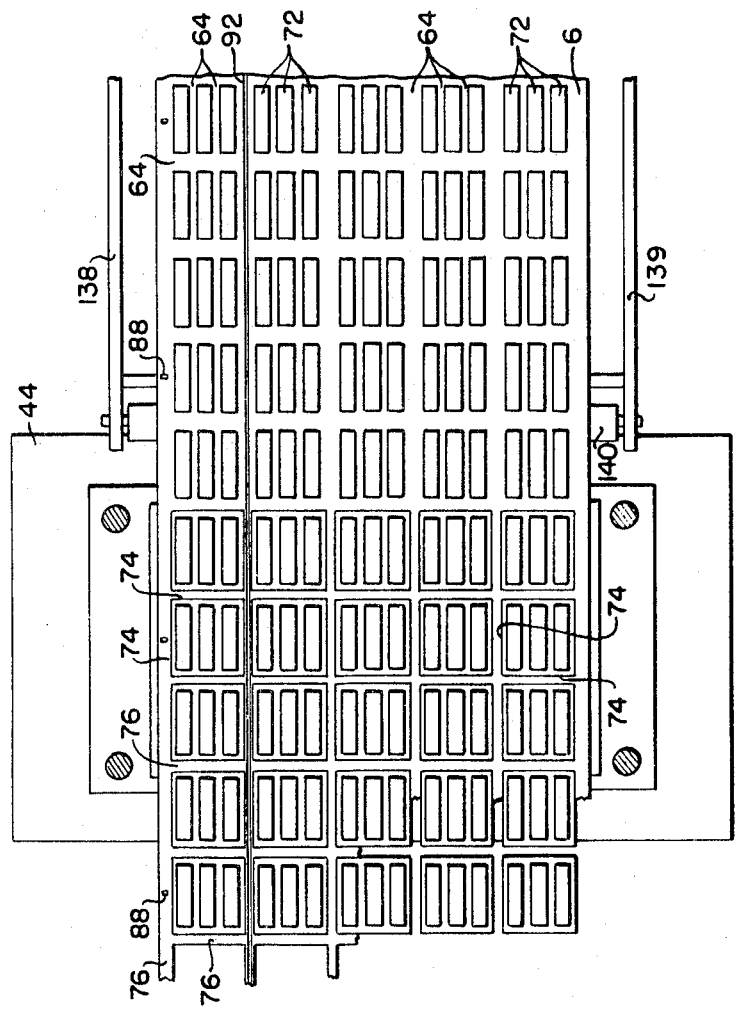

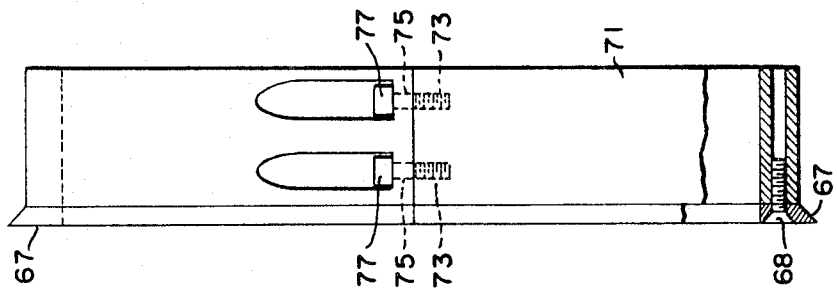
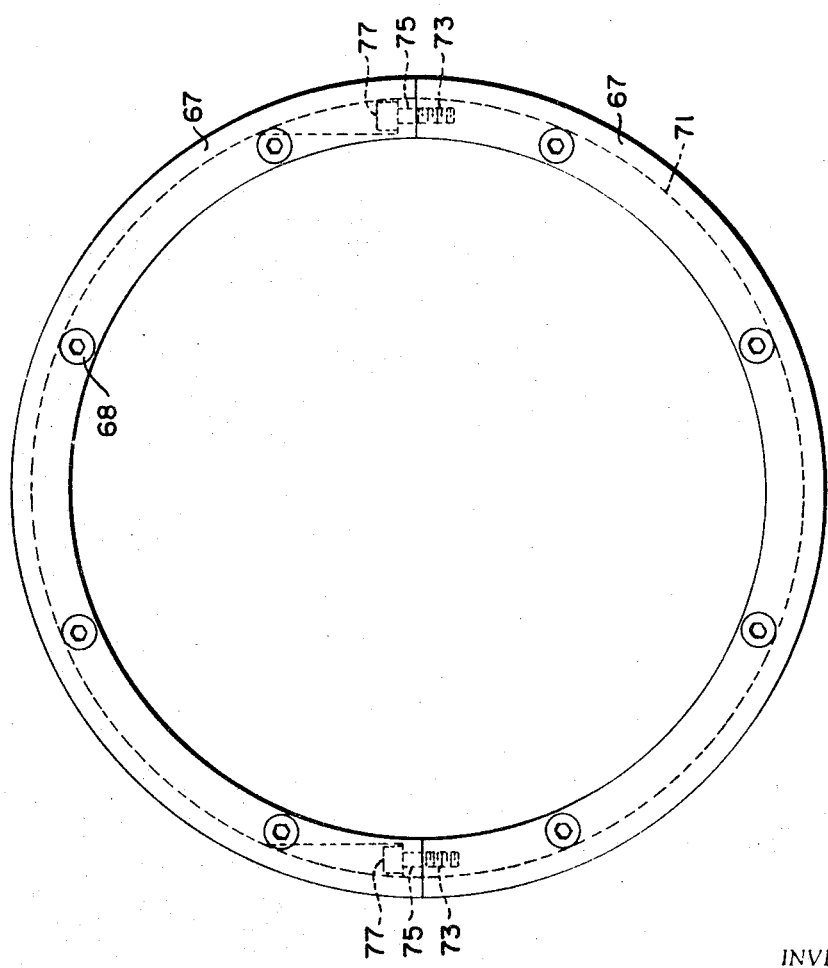

INVENTORS
HENRY J. BARCHI
DONALD C. FERGUSON
MERRILL M. SMITH
BY
Kenway, Jenney & Hildreth
ATTORNEYS

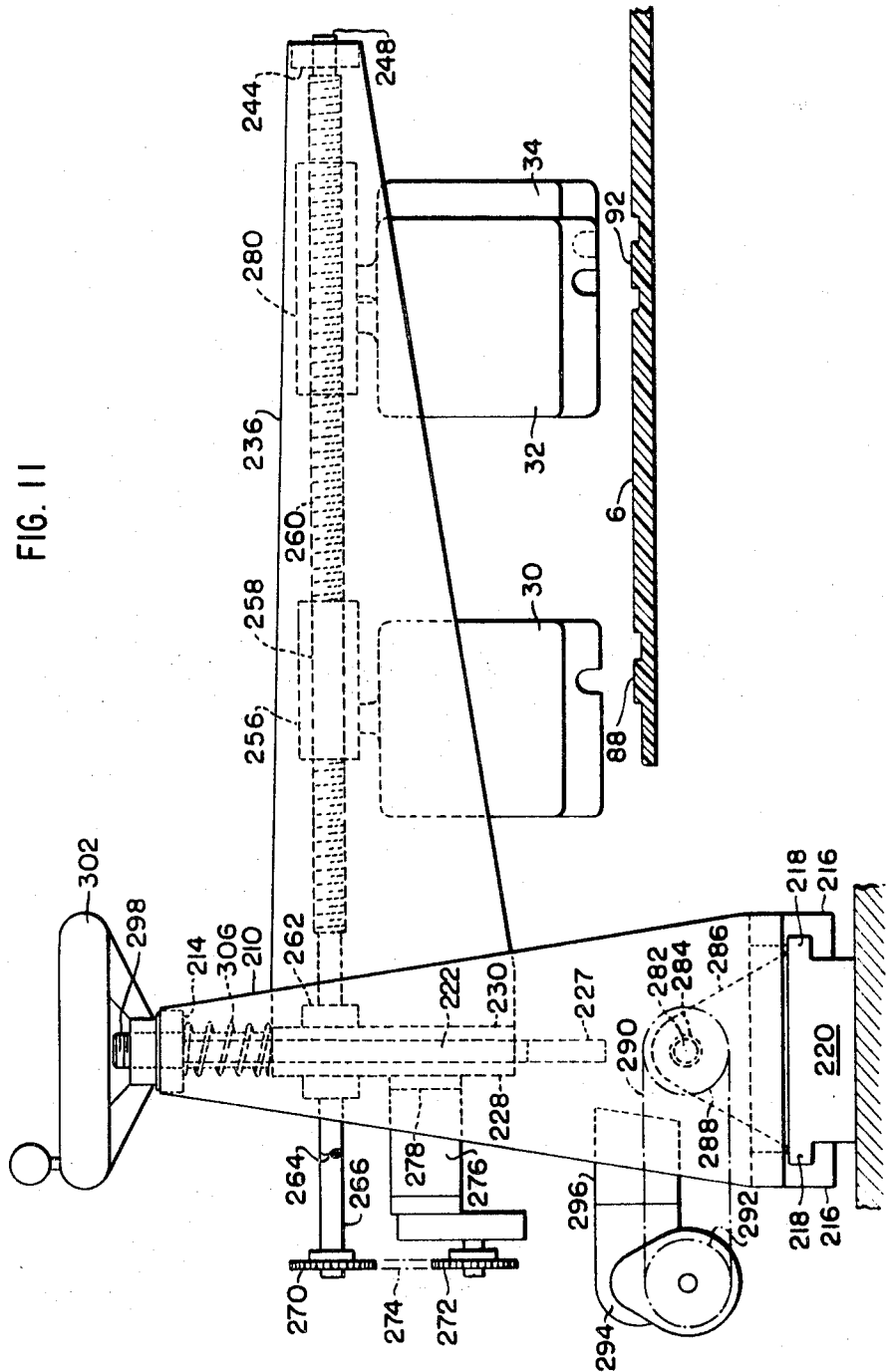

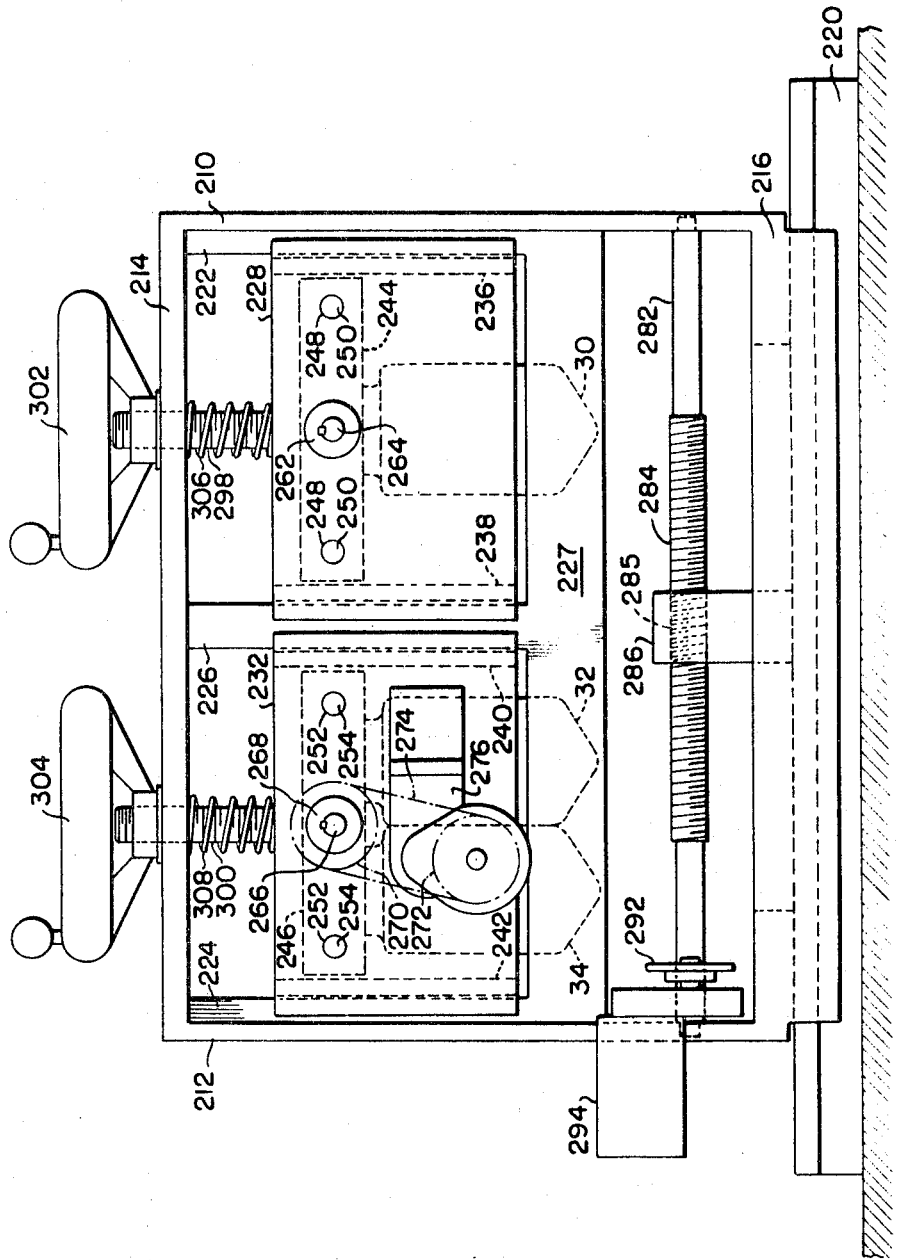

Sept. 9, 1969  H. J. BARCHI ET AL  3,465,384
APPARATUS FOR REGISTRATION OF PLASTIC WEB
Filed Feb. 8, 1967  9 Sheets-Sheet 9

INVENTORS
HENRY J. BARCHI
DONALD C. FERGUSON
MERRILL M. SMITH
BY
Kenway, Jenney & Hildreth
ATTORNEYS

# United States Patent Office 3,465,384
Patented Sept. 9, 1969

3,465,384
APPARATUS FOR REGISTRATION OF PLASTIC WEB
Henry J. Barchi, Yardley, Pa., Donald C. Ferguson, Trenton, N.J., and Merrill M. Smith, Morrisville, Pa., assignors to American Biltrite Rubber Co., Inc., Trenton, N.J., a corporation of Delaware
Filed Feb. 8, 1967, Ser. No. 614,618
Int. Cl. B29c 17/08
U.S. Cl. 18—4                                    12 Claims

ABSTRACT OF THE DISCLOSURE

The invention is an apparatus for forming, on a continuous basis, a plastic web, marking a repetitive pattern on the web together with registration marks, and thereafter by suitable control and punching means severing the patterned web into predetermined shaped flooring tiles, with both the tiles and the scrap web being thereafter moved away from the punching machine in such manner that the scrap material and the severed portions move away from the punching means and apart from each other on divergent paths to separate the same.

---

This invention relates to apparatus for cutting or punching, on a continuous basis, a repetitive pattern from a sheet of moving plastic, and particularly to means for automatically controlling the movement of the sheet in order to register the pattern properly in the cutting or punching means.

The invention includes a roll for printing a repetitive pattern on a moving sheet of plastic, conveying means for moving the sheet to a control conveyor, photoelectric cells for sensing the position of indicia on the sheet (and thus the sheet itself) with respect to a punching means, the photocells being able to start and stop the sheet while a punching operation takes place, a cutting or punching means for punching the pattern out of the sheet, and conveying means on the exit side of the punching means for removing the punched out pattern and scrap stock along two separate paths away from the punching apparatus.

In the art of punching or cutting a given shape or configuration from a rapidly moving sheet or web of plastic such as flooring material on a continuous basis, great difficulty is experienced in controlling accurately the lines along which the web is to be cut so that cutting always takes place correctly in respect to a predetermined pattern on the web. The plastic material from which flooring material (for example) is made such as vinyl resins or a vinyl-asbestos mixture, is such that in order to get a smooth cut edge, the material preferably is warm. Being warm, it is therefore subject to elongation during conveyance to a cutting apparatus from a preceding calendering roll, because of tensions that may exist, during such conveyance; or, if the material undergoes temperature changes during conveyance, the material may expand or contract unpredictably. Furthermore, if the mix for the material prior to the calendering roll changes, the characteristics of the web may change (depending on the mix) as to its elongation or contraction.

As a result, it has been difficult in the past to provide a registration system whereby cutting or punching takes place properly.

A further difficulty lies in that the material being punched or cut is of considerable thickness, running from approximately ⅛ inch thick to ¼ inch thick, and thus the material is not well suited to be cut by flying shears, etc. Instead tiles or other patterns are cut from the sheet or web of plastic by means of reciprocating punches. For economy's sake, the webs are made of considerable width (for example, 50 to 60 inches) and more than one pattern is cut at a time, particularly when floor tiles are being made. This necessitates punching machines of substantial size. With such large machines, it is difficult and time consuming to stop the punch itself while a given portion of the web is being located under the punch, and then start the punch to have it go through a punching operation. In this invention, the punching means is allowed to cycle continuously, and the web is adequately controllably stopped in registered position beneath the punch, both longitudinally and laterally, while a punching operation takes place. When the punch lifts from the web, the web is again started and brought into the succeeding registered positon. It is the fundamental purpose of this invention to provide apparatus and method for doing this.

Therefore, among the several objects and advantages of the invention may be noted the following: the provision of means for registering intermittently a continuously moving sheet or web of plastic in a punching means so that a repetitive pattern on the web will be in registration with the punching means for each punching cycle; the provision of a conveying means for controlling a moving web of plastic as the latter moves toward a punching means, the conveying means being automatically actuable to stop the web in proper longitudinal and lateral position with respect to the punch, in order to obtain proper registration of the pattern; the provision of a conveying means of the last named class in combination with sensing means actuable by registration indicia on the web, the sensing means controlling the longitudinal and lateral positioning of the web by the conveying means; the provision of the combination last stated in which the sensing means themselves are manually controllable as to position, in order to be able to correct deviations (both longitudinal and lateral) in registration; the provision of apparatus of any of the above classes in which means are provided for providing on the web a series of repetitive indicia bearing a predetermined proper registration relationship to the repetitive patterns on the web; the provision of single means for printing on a moving web of plastic material a repetitive series of patterns while at the same time providing on the web a repetitive series of control indicia having a predetermined fixed relationship with said patterns, and for simultaneously scoring the edges of the web in order to remove irregularties therefrom; and the provision of methods for registering a continuous web of plastic material in a punching means in such manner as to bring repetitive patterns on the web in registration with the punching means for cutting thereby.

Other objects and advantages will be in part apparent and in part pointed out hereinafter.

The invention accordingly comprises the elements and combinations of elements, features of construction, arrangements of parts, steps and sequence of steps, and features of operation of the apparatus, all of which will be exemplified in the structures and methods hereinafter set forth, and the scope of the application of which will be indicated in the following claims.

In the accompanying drawings, in which one of the various possible embodiments of the invention is illustrated:

FIG. 1 is a view, schematic, showing a complete operational production line embodying the instant invention;

FIG. 2 is an elevation of a pair of rolls used in the above embodiment;

FIG. 3 is an end view in section of the rolls of FIG. 2;

FIG. 4 is a plan view, partly in section, of a controllable conveyor belt apparatus for use in the present invention;

FIG. 7 is a view of a portion of the punching apparatus of FIG. 1, and showing the relationship of a web of plastic in relationship to the punching means;

FIG. 8 is a plan view of a scoring knife used in the invention;

FIG. 9 is a side view of the knife of FIG. 8;

FIG. 11 is a side view of a mechanism for holding photoelectric cells used in the invention;

FIG. 12 is a front view of the FIG. 11 mechanism;

Similar reference characters indicate corresponding parts throughout the several views of the drawings. Dimensions of certain of the parts as shown in the drawings may have been modified or exaggerated for the purposes of clarity of illustration and better understanding of the invention.

Figure 6:
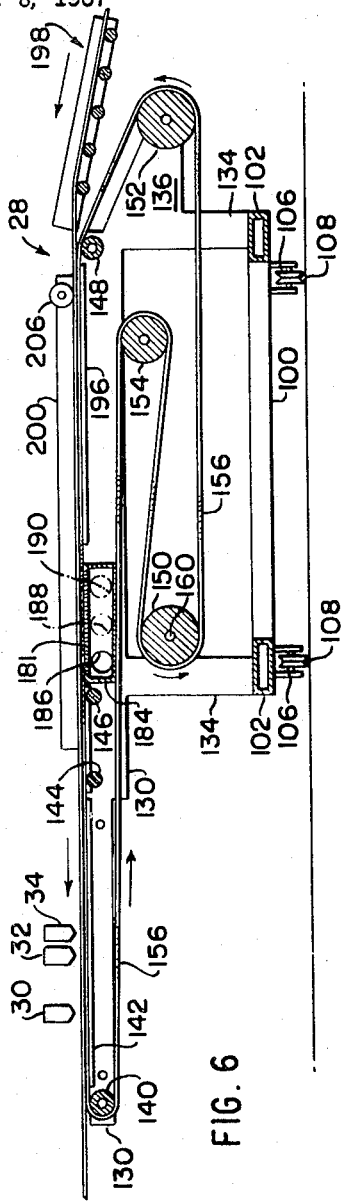
FIG. 6 is an elevation of the conveyor apparatus of FIG. 4 taken in the direction of sight lines 6—6 thereon.

Referring now to FIG. 1 of the drawings, there is shown schematically a production line for, as an example, the punching of ornamental floor tiles from a sheet of plastic, on a continuous production basis, in accordance with the invention. The flow line of the process is from right to left as viewed, and indicated by numerals 2 and 4 schematically are calender rolls, from the exit side of which issues a moving sheet or web 6 of vinyl asbestos material or other suitable plastic. The premixing of the vinyl asbestos composition, and the calendering rolls 2 and 4 and use of a doctor-knife 8 are conventional. In the instant example, the sheet of plastic is approximately 57 inches wide and ¼ inch thick. These dimensions are given merely as an illustration and, of course, may be varied depending upon the particular requirements of the finished tile product.

Sheet 6 then passes through a pair of rolls 10 and 12, the purpose of which is to impose on one surface of the sheet a predetermined design, and registration indicia. In the instant embodiment, roll 10 is a printing roll and roll 12 is a backup roll. These rolls will be described in greater detail below.

From rolls 10 and 12 the sheet of material which now has printed on it a repetitive pattern of predetermined size and configuration, as well as registration indicia, passes through a cooling apparatus 14 which cools the sheet 6 by means of the water sprays 16, as an example, the sheet being supported and conveyed through apparatus 14 by means of a conventional conveyor belt 18. Since apparatus 14 is conventional in nature throughout, no further description will be given herein.

From cooling apparatus 14, the web 6 then passes, if desired, to a buffing machine 20 which is conventional in nature. Machine 20 may apply a wax coating to the sheet, if desired, or may simply polish the upper surface of the sheet by means of the polishing brushes or pads 22. The sheet 6 is conveyed through the buffing machine by means of a conventional conveyor belt 24.

From the buffing machine, the sheet 6 then passes to a control conveyor belt indicated generally by numeral 28. Since conveyor mechanism 28 is an important feature of the invention, a complete description thereof and its methods of use will be given below.

It is important to note that a loop 26 is provided at the exit side of the buffer 20, between the latter and conveyor 28.

Three photocells 30, 32 and 34 are arranged, with their light sources, above the surface of the sheet 6 in position, as will be explained below, to sense the registration marks which have been embossed and/or printed on the top of sheet 6 by the embossing or printing roll 10.

After the sheet 6 has passed by the photocells 30–34, it enters a punch press indicated generally by numeral 36. The punch press is conventional in construction, and as such it is illustrated schematically. An eccentric arbor 38 of the press reciprocally moves the punch member 40 up and down by means of the connecting link 42. A die 44 is stationed in the press, and by cooperation between the punch 40 and die 44, the patterned tiles are sheared, but not removed away, from the sheet 6. The web with its sheared tiles move out from the exit side of the press, and thereafter the tiles and scrap stock take two separate paths. The tiles 46 are conveyed away from the punch press on a conveyor belt 48 of standard construction, while the scrap stock 50 is conveyed away from the punch press along a separate path by means of the conveyor 52.

It is to be noted that since the tiles 46 are cut loose around their margins from the web but are not separated therefrom while in the press, the result is that the conveyor 52 is enabled to grip the scrap stock 50 and thus draw it continuously from the punch 36 along with the tiles. It is also to be noted that during those periods when the punching is taking place, and thus the web 6 is stopped momentarily, as will be described below, there is permitted a certain amount of slippage between the scrap stock 50 and the conveyor belt 52. When the web 6 then is started again into the punch, the friction between the scrap stock 50 and conveyor belt 52 is such as to move the scrap stock away from the punch, thus assisting in drawing the web 6 properly into position under the punch.

Referring now to FIG. 2, there is shown in elevation the rolls 10 and 12. Also shown, in section, is the web 6 as it passes between these two rolls.

Roll 10 is, in this embodiment, a printing and embossing roll and on it are provided (see also FIG. 7) a series of rectangularly shaped depressions 60 in the surface of the roll, thus providing the projecting lands 62. The combined effect of the depression 60 and lands 62 is to emboss on the web of soft plastic a series of raised rectangles which resemble bricks. The bottoms of the depression 60 may be configured, if desired, so as artificially to simulate the appearance of brick faces. At the same time that the roll 10 is embossing the top surface of the web 6, printing ink may be applied to the surface of the lands 62 in order to color the depressed areas or margins 64 which lie around the thus-formed bricks, a different color from the normal color of the plastic.

At each end of the roll 12, there is provided a cutting or scoring knife 66. Each of the cutting or scoring knives is a composite assembly (see FIGS. 8 and 9) comprising two semicircular knife structures, each of which comprises a semicircular, edged knife portion 67 which is fastened by means of bolts 68 to a semicircular band 71, the radius of curvature of the inner periphery of the band being adapted to fit the roll 12 at each end thereof. Suitably threaded holes 73 are provided at each end of two of the semicircular bands, and mating clearance holes 75 are provided at respective ends of the other semicircular bands. The clamping bolts 77 are then inserted through the clearance holes to engage the threaded holes in order to clamp the bands about the ends of the hole 12.

The function of the cutting or scoring knives 66 is to score the edges of the plastic sheet during the embossing step, for the reason that as the web emerges from the calender rolls 2 and 4, the edges thereof will be rough and irregular. In order to obtain proper lateral guidance of the web (as will be described below) just ahead of the punch press 36, these rough edges must be made relatively smooth and linear. However, if the knives 66 were to cut entirely through the sheet 6 at each edge thereof, the cut portions 70 would be very apt to become enmeshed between the rolls 10 and 12, with the result that the embossed sheet material would become spoiled. For this reason, the relationship of the cutting edge of the knives 66 with the roll 10 is such that the knives do not cut completely through the plastic web. As a result, when the sheet emerges from the embossing rolls 10 and 12, the cut edges 70 are still attached to the web by a small thickness of plastic material. It is at this point, after the web has emerged from the embossing rolls, that the cut edges 70 are removed from the web either manually, or automatically by some form of gathering machinery. In view of the fact that plastic material is warm at this stage and has not hardened, it has been found that the cut edges 70 may be removed quite readily to leave a fairly smooth edge on the web 6 for further processing.

As indicated, after the web has left the embossing rolls, it bears on its surface sets of similar bricks 72, and in this instance, it will be noticed that the sets of bricks are arranged in threes and that the depressed areas between the bricks are relatively narrow, while the depressed areas that surround each set of three are relatively wide. The reason for this is to allow such cutting of the tiles from the web as to leave the scrap stock connected together as a framework, thus permitting its continuous withdrawal from the press. The cutting lines done by the punch 40 are indicated by numerals 74 (see FIG. 7) and thus it will be observed when the sets of three tiles mentioned above are cut or severed from the sheet, there is left the strips 76 which hold together the scrap stock so that it may be manipulated beyond the exit side of the punch 36.

The roll 12 is a backup roll, as indicated above, and is generally provided with a smooth surface. It is preferably provided with a rubber surface in order to assist the web in passing through the rolls. Each of the rolls 10 and 12 are mounted on conventional bearings 78 and 80, respectively, these bearings being held in conventional manner in the framework of the embossing machine.

The embossing roll 10 is also provided with indicia-forming recesses 82 and 84. Recess 82 occurs once on the periphery of the roll, and makes a raised indicium mark 88 (see FIG. 7 also) near one edge of the web 6 for each revolution of the roll 10. The recess 84 provides a continuous stripe 92 running the entire length of the sheet, to be used for lateral registration as will be described below.

It is to be noted that while in this embodiment, photocells are used to "read" the several indicia or registration marks, nevertheless other means of sensing the position of the web with respect to the punch 36 may be used, such as by using mchanical feelers to sense the raised projections and actuate control mechanisms.

The circumference of roll 10 is made substantially equal to the length of the punch 40 (taken in the direction of the movement of the web 6). Thus, it is seen that there is a direct correlation between the circumference of the roll 10, the longitudinal separation of the registration marks 88, and the longitudinal distance or length on the sheet occupied by three longitudinally arranged sets of bricks, together with the intermediary scrap-stock connecting strips 76.

The punch 40 has a width with respect to the width of the sheet 6, that in shearing the sets of three bricks from the web 6, that portion of the web edge which contains the longitudinal registration indicia 88 is separated from the sets of bricks, and therefore does not appear in the final tiles. Similarly, the punching operation is carried out in such manner that the lateral registration mark 92 is left on the scrap stock 50, and thus does not appear in the finished tiles. For speed of production, and as indicated in FIG. 7, one stroke of the punch cuts out 15 individual tiles comprising a set of three bricks.

Figure 5:
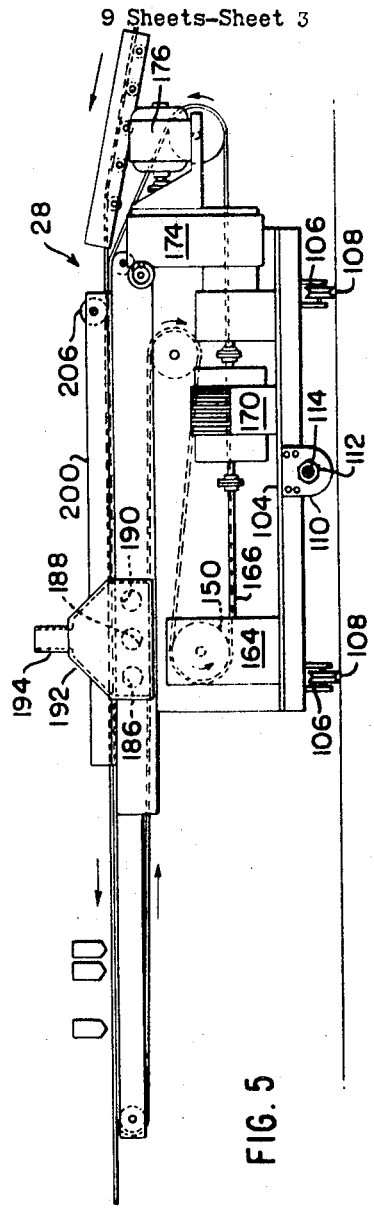
FIG. 5 is a side view of the conveyor apparatus of FIG. 4, taken on sight lines 5—5 thereon.
Figure 10:
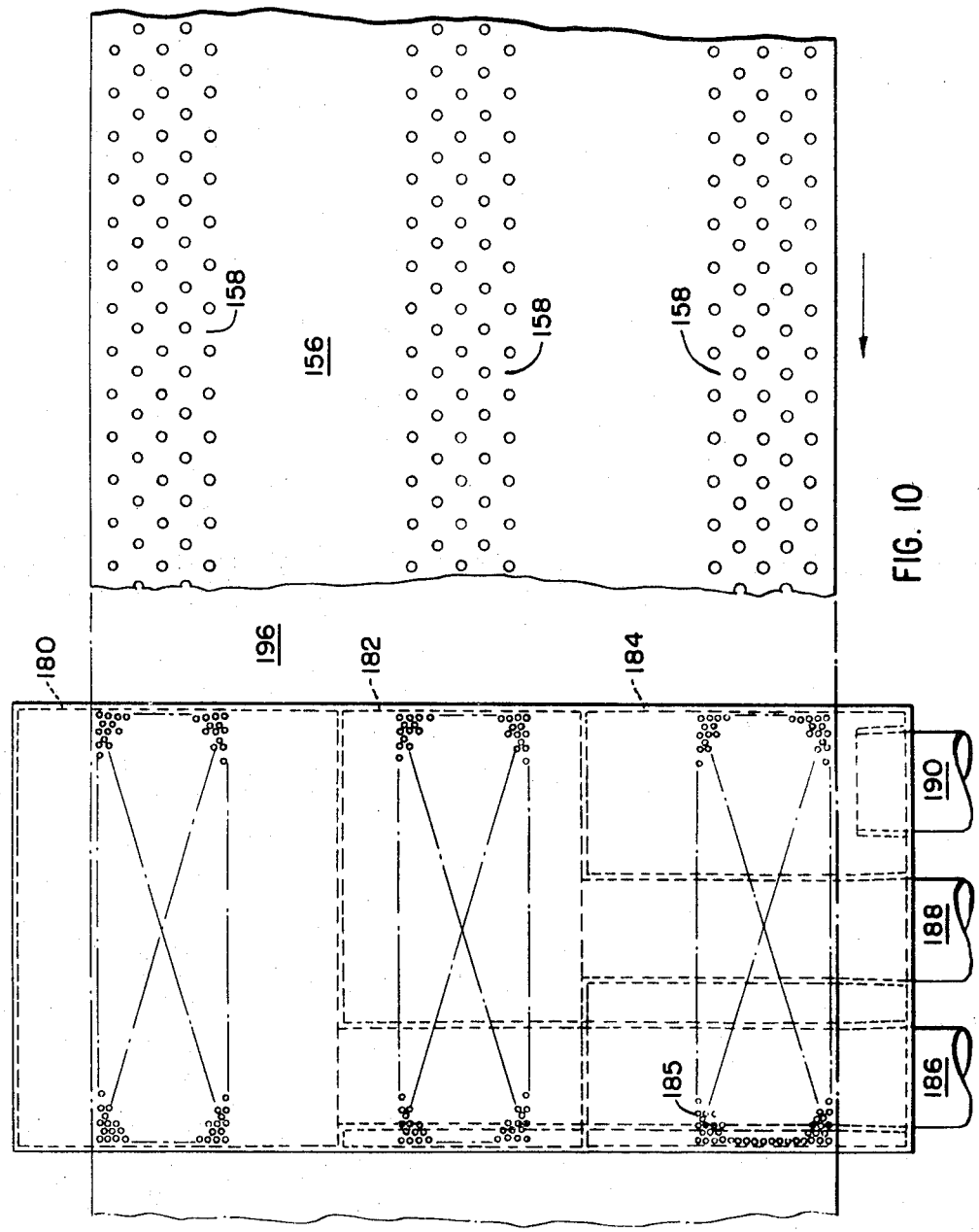
FIG. 10 is a plan view of a portion of the conveyor belt and of the conveyor bed, enlarged over the above views to show certain details of construction in greater clarity.

Referring now to FIGS. 4, 5 and 6, there are illustrated the details of the control conveyor apparatus of this invention. Referring first to FIGS. 5 and 6, the conveyor 28 has a rectangularly-shaped framework or base 100 on which most of the entire apparatus is mounted so that it may be moved laterally. The base 100 is shown as being conventionally made by welding together lengths 102 of tubular structural steel in order to provide a movable platform of substantial strength and rigidity. A platform 104 is mounted by conventional means on over a portion of the framework 100 for the support of certain operating elements which will be described below in reference to FIGS. 4 and 5. Preferably, the platform 104 is of sheet steel. Below the framework 102 at four corners thereof are mounted rollers 106 which ride on the runways 108, the latter being suitably fastened to the floor of the area in which the apparatus is to be used. The runways 108 extend from side to side of the conveyor 28, as shown, a sufficient distance to allow for a certain amount of lateral movement of the conveyor 28 itself.

Dependent from the framework 102 is an apron 110 which has mounted thereon a fixed nut 112. Threaded into nut 112 is a lead screw 114, this lead screw also passing through a bearing 116 which is fixed to an upright bracket 118 (see FIG. 4) which is fastened to a base plate 120 which in turn is anchored to the floor of said area. Lead screw 114 is journaled in the bearing 116 and is locked in position therein against any longitudinal motion. Consequently, as the lead screw 114 is rotated, the framework 100 moves laterally in respect to the flow line of the web 6 in the process. A sprocket 122 is affixed to the end of lead screw 114 on which is trained a sprocket chain 124 which in turn is entrained on the sprocket 126 of a combined gear reduction and motor unit 128. Motor 128 is of the reversible type, having field coils 392 and 394, one of these driving screw 114 in one direction, and the other driving the screw in the other direction.

As a result of the above construction, when the motor 128 is rotated in one direction, then the whole conveyor apparatus is moved in one direction laterally; and when motor 128 is rotated in the other direction, then the conveyor 28 is moved laterally in the opposite direction. As will be described below, the motor 128 is under the control of photocells 32 and 34 which are sensing or "feeling" the registration mark 92.

A pair of structural steel side frames 130 and 132 are vertically mounted on framework 100 by means of legs 134, the side frames 130 and 132 being spaced apart as shown in FIG. 4. Each of the side frames is provided at one end with extending support arms 136 and 137, and at the other end with extensions 138 and 139.

Between extensions 138 and 139, there is mounted (rotatably) a roller 140. At the right of roller 140 (as viewed in FIG. 4) and mounted between the framework arms 130 and 132 there is mounted a plate 142 for supporting along its length the conveyor belt 156 described below. Support rolls 144 and 146 are rotatably mounted within the framework, these rolls also serving to support the conveyor belt. A further support roll 148 is rotatably mounted at the other end of the machine as shown in FIG. 4.

Also rotatably mounted on suitable bearings within the side frames 130 and 132 are a drive drum 150, a support drum 152, and an idler roll or drum 154 for tensioning conveyor belt 156. The idler drum 154 is suitably mounted on conventional means for shifting it laterally as viewed in FIG. 6, in order to adjust the tension in the conveyor belt 156. In order to simplify the drawings, this lateral adjustment is not shown since it is conventional in nature and well known to designers of such machinery.

Trained on the rollers 142, 144, 146, 148 and drums 150, 152, and 154 is a conveyor belt 156 whose construction will now be described. The conveyor belt is made of neoprene-impregnated four ply ⅛ ounce canvas duck material. At the top and bottom surfaces thereof bare canvas is exposed in order to provide a friction surface. The conveyor belt is approximately 52 inches wide and is provided with three sets of perforations 158 therethrough, each set of perforations extending continuously the entire length of the belt. Thus, each set constitutes an endless area in the belt through which air may be drawn for the purpose of applying suction against the bottom surface of the web 6 which lies on the belt during operation of the apparatus, and whose movement is controlled by the conveyor belt. The holes 158 are approximately 3/8 inch in diameter and are separated by approximately 3/4 inch, the width of a set being approximately 6 inches. Belt 156 may be endless, that is, made in one piece, or may be of end-lapped construction.

Drive drum 150 is driven by a shaft 160 which is coupled to the output shaft 162 of a gear reduction unit 164. The input shaft 166 of unit 164 is coupled to the output shaft 168 of a combination brake and clutch mechanism 170. The input shaft 172 of mechanism 170 is, in turn, coupled to a speed reducing mechanism 174, which is driven by an electrical motor 176. As examples of the above gear reduction units, brake and clutch apparatus, and speed reducing unit, the following have been used successfully: The gear reduction unit 164 may be a Link-Belt Universal Single Worm Gear Speed Reducer Type U–400. Unit 170 may be an Eaton Dynamatic Cycl-Torq, Model 644541. Speed reducing unit 174 may be an Allis-Chalmers Vari-Tex unit, Frame 184 AM 2 AMG 2203, 2 horsepower, 1800 r.p.m. input, 9.31:1 ratio. These units, or other equivalent units, are available on the market today. The speed reducing unit 174 is controlled as to its speed by means of the turn wheel 178.

Adjacent the roll 146 and extending across the conveyor are three rectangularly-shaped box-like manifolds 180, 182 and 184, the tops of which constitute combined supporting means for the belt 156 and suction-applying means. The top of each manifold is provided with a plurality of holes 185, the holes being about 1/8 inch in diameter and spaced about 3/8 inch center to center. The holes in manifold 180 underly the path of perforations 158 at one side of the belt 156, those in manifold 184 underly the perforations 158 at the other side of the belt, and the holes in manifold 182 underly the center group or set of perforations in the belt. To each of the manifolds is connected a suction pipe 186, 188 and 190 respectively, these suction pipes terminating in a header 192 which is in turn connected by means of suitable piping 194 to a vacuum pump of a size capable of producing a vacuum of about 1½ inches of mercury within the manifolds 180, 182 and 184.

Attached to the general framework in such position as to underly the belt 156 is a supporting plate 196 which extends across the width of the conveyor, and lengthwise extends from the suction boxes 180–184 to the roller 148.

Leading up to the top of the conveyor apparatus 128 from the right hand side as viewed in FIG. 6, is a set of rotatable rollers indicated generally by numeral 198. The function of these rollers is simply to support the web 6 after it leaves the buffing apparatus 20 and up to the time that it comes in contact with the conveyor belt 156.

Mounted on each side of the top bed of the conveying apparatus is an elongated guide or fence 200. Each of guides 200 is conventional in nature and comprises an elongated upwardly extending bracket 202 which is supported on an elongated base 204, the latter being attached to the top plate of the bed of the conveyor. The function of the guides 200 is to restrain the web 6 laterally on the conveyor apparatus itself, so as the latter is shifted laterally by the operation of motor 128, the web 6 will be correspondingly shifted. At each end of the supports or guides 200 is rotatably mounted roller 206 the function of which is to press the web 6 downwardly against the belt 156 and between the guides as the web reaches the conveyor 28.

Referring now to FIGS. 11 and 12, there is shown one form of support for the photoelectric cells 30, 32 and 34. The support comprises a framework having the side arms 210 and 212 and a top bar 214, these parts being assembled together conventionally as by bolting or welding. At the bottom of the side supports, there is provided a pair of key-way guide members 216 in which are milled the key-way slots 218. These slots fit slidably about the elongated T-bar 220 so that the latter provides longitudinal slide for the entire framework 210–216 along the T-bar. Positioned vertically against the inner surfaces of support arms 210 and 212 are the guide bars 222 and 224 respectively, and vertically mounted at the center of the framework is a third guide bar 226. A cross-bar 227 connects the lower ends of guides 222 and 224.

Slidable on the guide bars 222–226 are a pair of slide assemblies, one comprising the slidable supporting plates 228 and 230, and the other comprising the plates 232 and 234. The plates of each pair (228–230 and 232–234) are spaced apart the width of the guide bars 222–226 by conventionally applied spacers, so that the slide assemblies slide snugly on the respective guide bars.

Anchored to each of the plates 230 and 234 are the laterally-extending, spaced-apart arms 236, 238, 240 and 242, the ends of the arms being welded or otherwise fastened to the respective plate. Fastened to the outer ends of each pair of support arms there are the cross members 244 and 246. Plates 228 and 230, and crossmember 244 are provided with mating spaced-apart mounting holes 248 in which are received the ends of the laterally extending guide rods 250. Similarly, the face plate 232 and 234, and cross-member 246 are provided with mating spaced-apart mounting holes 252 in which are received the ends of the laterally-extending guide rods 254.

Slidably riding on the guide arms 250 is a carriage 256 through which is provided with a threaded bore 258. Photocell 30 depends from the carriage 256. A threaded shaft 260 is journaled at one end in the cross arm 244, and in a bearing 262 which is mounted in the plates 228–230. The end 264 of the shaft 260 projects to the left (as viewed in FIG. 11) to clear the front of the framework, and on this end may be fitted a hand wheel (not shown) by means of which the shaft 260 may be turned in order to shift the position of the photocell 30 along the shaft and thus laterally with respect to the web 6, as the latter traverses the conveyor belt apparatus.

Similarly, a shaft 266 is journaled at one end in the cross bar 246 and in a bearing 268 mounted in support plates 232 and 234. A sprocket wheel 270 is fastened to the end of shaft 266, and trained on this sprocket wheel and a second sprocket wheel 272 is a sprocket chain 274. Sprocket wheel 272 is attached to the output shaft of a gear-reduction motor 276 so that by rotation of the motor, shaft 266 may be turned. Motor 276 is attached to the vertical support plates 232 by means of a bracket 278.

A carriage 280 is mounted slidably on the guide rods 252, and like carriage 256 is provided with a threaded bore which engages a threaded portion of the shaft 266. Thus, by rotation of motor 276, the carriage 280 may be adjusted along the shaft 266 and thus laterally with respect to the web 6. Dependent from the carriage 280 are the photocells 32 and 34.

A shaft 282 is journaled by its ends in the bottom portions of the support arms 210 and 212, and has a center threaded portion 284. A nut 286 is fixed to the T-bar bed 220 and is provided with an interiorly threaded bore 285 which engages the screw threads 284. A sprocket wheel 288 is fixed at one end of the shaft 282, and a sprocket chain 290 is trained on sprocket wheel 288 and also on sprocket wheel 292 the latter being fastened to the output shaft of a gear reduction motor 294. Motor 294 is mounted on a support bracket 296 which is fastened to the bottom portion of the support arm 212. Thus, by energizing motor 294, the entire framework carrying the photocells may be moved longitudinally with respect to the web 6 and the press 36.

Affixed to each of the slide assemblies comprising the vertical support plates 228–230 and 232–234 together with the respective pairs of lateral arms extending therefrom, are the lead screws 298 and 300. The upper ends of these screws pass through suitable holes in the top bar 212, and are threadably engaged by the hand wheels 302 and 304. Springs 306 and 308 surround the screws between the underside of top bar 214 and the tops of the vertical support assemblies in order to maintain any vertical adjustment of the assemblies and the photocells supported by the lateral arms.

With the above construction, it will be seen that the lateral positioning of the photocell 30 across the flowing web 6, and thus in relationship to the registration mark 88, is obtained by manually turning the shaft 260. Lateral motion of the photocells 32 and 34, to focus them properly on continuous registration mark 92, is obtained by turning the shaft 266 by means of the motor 276. Longitudinal motion of all the photocells in respect to the press 36, particularly photocell 30, is obtained by rotating the motor 294.

As will be described below, each of the motors 276 and 294 is controlled as to starting and stopping, and as to the direction of its rotation, by means of manually-actuable switches 310–312 and 314–316 respectively which are preferably located on or at the exit side of the punching operation, these switches being under the control of the press operator at said exit side, and their circuits being shown in FIG. 13. Thus, if the operator sees that the flowing web of plastic is drifting away from its correct longitudinal relationship or registration with the punching means, then by means of the switches 314 and 316 and the motor 294, he can manually adjust the position of the photocell 30 in order to correct the adjustment of the registration. Similarly, if the operator of the punching means sees that the lateral registration is shifting, the operator can by energizing motor 276 (by means of switches 310 and 312) adjust the lateral positioning of the photocells 32 and 34 and thus lateral positioning of web 6. Vertical adjustment of all photocells is made by the hand wheels 302 and 304, and once set, it will probably not need further adjustment.

Figure 14:
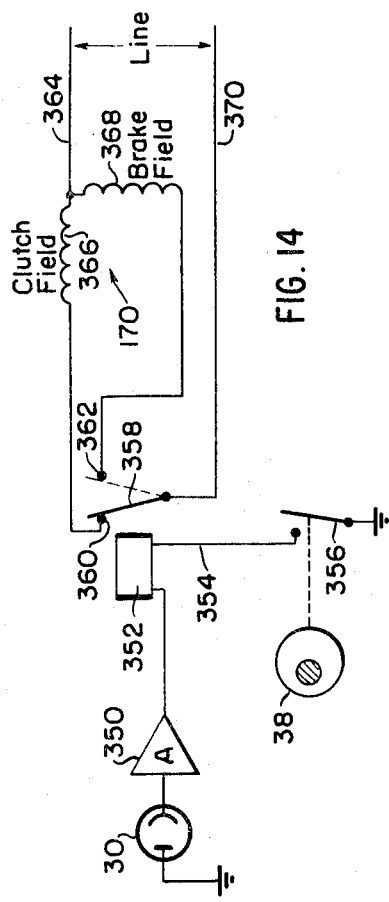
FIG. 14 is a schematic diagram of a photocell control circuit for the longitudinal registration function of the apparatus.
Figure 15:
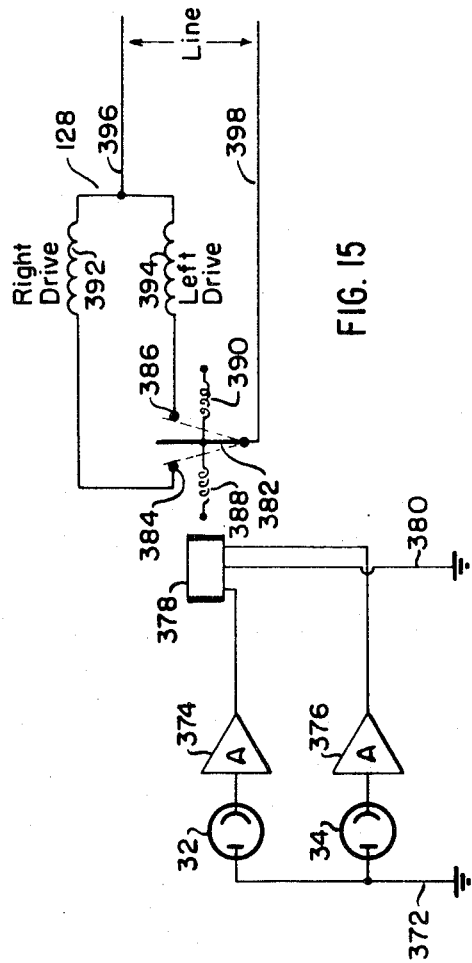
FIG. 15 is a schematic diagram of a photocell control circuit for the lateral registration function of the apparatus.
Figure 13:
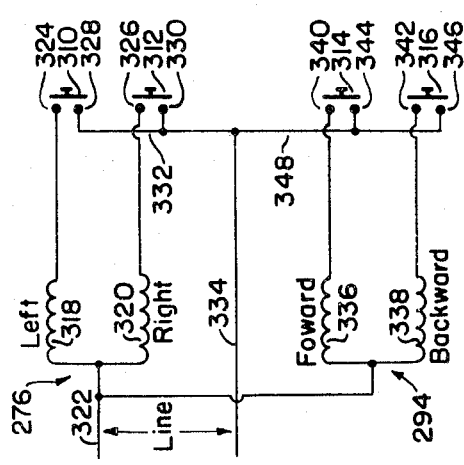
FIG. 13 is a schematic diagram of a circuit used for the control of the adjustment of the photocell apparatus of FIGS. 11 and 12.

Referring now to FIGS. 13, 14 and 15, there are schematically shown the wiring circuits for the manual control of the positioning of the photocells 30–34, and the automatic control of the control conveyor 28.

Referring first to FIG. 13, the motor 276 is schematically shown as having left and right field coils 318 and 320, the term "left field coil" conventionally referring to the field coil that is energized for rotation of the motor in one direction, and the term "right field coil" indicating that winding energized for rotation of the motor in the other direction. One end of each of the field coils 318 and 320 is connected to one side of line 322. The other end of coil 318 is connected to contact 324 of the momentary-contact type push button switch 310. The other end of the field coil 320 is connected to contact 326 of a similar switch 312. Terminals 328 and 330 of switches 310 and 312 are both connected by a lead 332 to the other side 334 of the power line.

Motor 294 is shown as having two coils 336 and 338, one being energized to rotate the motor in one direction, and the other being utilized to rotate the motor 294 in the opposite direction. One end of each of these coils is connected in common and to power line 322. The other ends of each of these coils are connected to the terminals 340 and 342 respectively of the momentary-contact push-button switches 314 and 316. The other terminals 344 and 346 of these switches are connected by lead 348 to the power line 334. By pushing the respective push-button switches, the operator of the punch press can manually control the position of the photocells with respect to the press, both longitudinally and laterally.

Referring now to FIG. 14, there is shown in schematic from a photoelectric control circuit having the photocell 30 and amplifier 350 therefor, the amplifier feeding one side of relay coil 352. The other side of relay coil 352 is connected to ground via wire 354 and thus to the other side of amplifier 360, this connection being interrupted by switch 356. Switch 356 mounted on press 36 and is positioned to be under the control of the eccentric arbor 38 of the punch press. The switch is so located with respect to the eccentric motion of the arbor 38 that the switch is open except for that portion of the web travel existing from just ahead of the registration mark 82 to just behind it. Since the switch 356 is therefore open during the major portion of the web travel, the relay 352 cannot be energized except when the registration mark is about to approach the photocell 30.

The relay coil 352 controls through its contact arm 358 and its contacts 360 and 362 the brake and clutch field coils of the combination brake and clutch mechanism 170. One end of each of these field coils is connected in common and to line 364 of the power supply. Contact 360 of the relay is connected to the other end of the clutch field coil 366, and relay contact 362 is connected to the other end of the brake field coil 368. Contact arm 358 is connected by line 370 to the other side of the power supply.

The operation of the longitudinal conveyor control circuit is as follows:

With the switch 356 open, the relay 352 is deenergized, and contact arm and contact 360 are normally closed. This means that the brake field 368 is normally not energized, but clutch field 366 is energized. Thus, the conveyor 28 is operating and the web is moving into the punch press 36. Upon due rotation of the eccentric 38, the switch 356 becomes closed and (as described above) this closing takes place just prior to a registration mark 88 coming within the "sight" of the photocell 30. With the switch 356 closed, when the photocell 30 sights the registration mark 88, it energizes relay 352 to throw the contact arm 358 over to contact 362. This deenergizes the clutch field coil 366 and energizes the brake field coil 368, both events serving to stop the conveyor 28. A punching operation now takes place, whereupon the switch 356 again is opened by action of the eccentric 38, thus releasing relay 352 to reenergize the clutch field (and, as a corollary, to deenergize the brake field) to start the conveyor again to convey more web into the punching press.

Referring now to FIG. 15, there is shown in schematic diagram the control circiut for the lateral adjustment of the conveyor bed to effect proper lateral registration of the web 6 in the punch press. The photocells 32 and 34 are shown, having one side thereof connected schematically in common to ground by line 372. Photocell 32 feeds into the amplifier 374, and photocell 34 feeds into amplifier 376. The outputs of the amplifiers 374 and 376 are fed to each end of a relay coil 378, the center turn of which is connected by line 380 ground. Relay 378 is a single-pole double-throw switching device with its contact arm 382 being spring-biased to rest normally midway between stationary contacts 384 and 386, the biasing means being schematically shown as by the springs 388 and 390. Thus, when the coil 378 is energized by amplifier 374, contact arm 382 is pulled to the left against the bias of spring 390 (as viewed) order to make contact with stationary contact 384. On the other hand, when relay 378 is energized by amplifier 376, the contact arm 380 is moved to the right (as viewed) against the bias of spring 388 in order to make contact with stationary contact 386.

As indicated above, the lateral traversing motor 128 is of the type that may rotate in either direction, depending upon the energization of its field coils. This motor is indicated schematically, and the field coil 392 when energized will move the conveyor table in one lateral direction, and when the field coil 394 is energized, the motor 128 will move the conveyor bed in the other lateral direction. One end of each of the coils 392 and 394 is conventionally connected to one side 396 of the line. The other side of the line 398 is connected to the contact arm 382. Stationary contact 384 is connected to the other end of the field coil 392, and stationary contact 386 is connected to the other end of field coil 394.

The operation of this lateral control system is as follows: The field of view of each of the photocells 32 and 34 is located entirely within the edges of the continuous registration line 84, but with that of cell 32 close to one edge of mark 84, and that of cell 34 close to the other edge. Assuming, which is preferable, that the continuous registration line 84 has been printed a dark color, then since each photocell is so positioned as to have its field of view within the line 84 when registration is proper, the photocells do not produce a signal sufficiently strong to fire their respective amplifiers. Remembering that the fields of view of the photocells on the indicium line 84 are staggered laterally so that each is close to a respective edge of mark 84, then when registration of the web 6 shifts, for example, so that the field of view (or "sight") of photocell 32 now overlaps both a portion of the indicium line 84 and the lighter background of the web 6, this will cause the photocell 32 and amplifier 374 to become energized. (Photocell 34 and amplifier 376 are not energized because the field of view of cell 34 will still be on the indicium line 84.) The result is that the relay 378 will become energized from the amplifier 374. This will pull the contact arm 382 to the left (as viewed) making a connection with stationary terminal contact 384. As a result, the right drive field of the motor 128 is energized, and the whole conveyor bed is shifted in the proper direction to again center the indicium line 84 beneath the sight of both photocells 32 and 34. When this happens, again the circuit through the relay 378 is deenergized, and the contact arm 382 becomes again centered between the contacts 384 and 386, so that there is no connection with either of them. As a result, the field coils 392 and 394 are not energized, motor 128 is not operating, and the conveyor bed and thus the web 6 remain centered in their proper registration position. A similar operation takes place if the registration is to make an error in the other direction, in which case the photocell 34 and its amplifier 376 energize the other side of relay 378 in order to energize the left drive field 394 of the motor 128 for correction.

As first indicated, the above photocell circuits are conventional in nature, and there are many types of cell circuits that can work for this system. Those given are only exemplary, and are given in schematic form.

While the operation of the apparatus will be inherently clear to one skilled in the art in view of the above description of the various functions of the elements thereof, nevertheless a brief description of the operation of the invention will not be amiss at this point, particularly since it is desired to emphasize an important feature of the invention.

As set forth above, material in web form is supplied from the calendering rolls, and continuously progresses through the embossing rolls 10 and 12, the cooling system 14, and, if desired, the waxing and/or buffing apparatus 20. From the latter, the material is fed into the loop 26 and from there onto the control conveying means 28. From and under the control the latter, it is fed into the cutting means 36 where the tiles are separates from the web material.

As the web material 6 is moved along by the conveying apparatus 28, a longitudinal registration mark is sighted by the photocell or other sensing means 30, and promptly the conveying system 28 is stopped, thus stopping the flow of the web 6 into the punching press 36. The punch 40 of the press descends, severs the desired pattern of tiles as set forth above, and then commences to lift. Once the punch 40 has cleared the web material, the conveying system 28 again starts to feed more material into the press. This cycle of feeding, stopping, punching, and starting continues as long as the web 6 is supplied.

It is important to note that while a punching operation is taking place, the conveying system 28 (and thus the web 6) ahead of the cutting apparatus 36 is stationary, but meanwhile the web 6 is continuously flowing from the embossing rolls 10 and 12 toward conveying means 28. Therefore, the continuous flow of the web 6 into the loop 26 would, over a period of time, build up the loop to unmanageable size unless provision were made to prevent this. The provision made in this invention is to have the conveying system 28 move the web into the cutting means 36 (when the apparatus 28 is operating) at a rate faster than the web material is flowing into the loop 26. That is, any excess material that flows into the loop 26 while the conveyor 28 is stopped is then taken out of the loop by the conveyor by operating it at a faster speed than the normal flow of the web 6 into the loop. As examples of these speeds, the system has been operated satisfactorily with the web 6 flowing into the loop at a speed of approximately 70 feet per minute, whereas the speed of the web as it is conveyed by the conveyor 28 is approximately 80–85 feet per minute. These speeds are given only as exemplary, and the actual relative speeds of operation will be determined by the length of time that the conveyor 28 is not conveying material out of the loop 26 in relation to the speed of flow of web into the loop 26.

In view of the above it will be seen that the several objects of the invention are achieved and other advantageous results attained.

It is to be understood that the invention is not limited in its application to the details of construction and arrangement of parts illustrated in the accompanying drawings, nor to the methods described, since the invention is capable of other embodiments and of being practiced or carried out in various ways. Also, it is to be understood that the phraseology or terminology employed herein is for the purpose of description and not of limitation.

As many changes could be made in the above constructions and methods without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

We claim:
1. Apparatus for accurately making plastic tiles of predetermined size and shape comprising in combination:
   means for preparing a moving web of plastic material;
   roll means for providing a pattern and registration indicia on one surface of the web and means for scoring the edges of said web to provide selvage edge strips adapted to be readily removed from the web after the web has been marked with the indicia and the pattern, the registration indicia being in a constant predetermined relationship to said pattern;
   first conveying means adapted to receive the web from said roll and scoring means and move it in a forward direction;
   second conveying means adapted to be started and stopped controllably and also being adapted to receive the web from the first conveying means, the second conveying means holding the web with sufficient force to stop the movement of the web when the second conveying means stops;
   reciprocating punching means for completely severing tiles from the web while leaving the tiles completely surrounded by a framework of scrap web, the punching means having input and exit sides, the input side being positioned adjacent the second conveying means and adapted to receive the web;
   sensing means positioned adjacent said input side and adapted to receive a signal from each of the registration indicia to stop the second conveying means, thereby to locate that portion of the web which is within the punching means in a predetermined posi- tion with respect thereto while a punching operation takes place;

second control means operable at the end of each punching operation and adapted to restart the second conveying means to advance another portion of the web into the punching means; and third conveying means for removing the surrounding framework of scrap web and the surrounded tiles from the punching means, the tiles being initially moved solely by the framework of scrap web.

2. The apparatus of claim 1 in which said roll means is an embossing roll.

3. The apparatus of claim 1 in which the second conveying means comprises a perforated looped conveyor belt encircling a flat bed, the top reach of the belt traversing the top surface of the bed in a direction toward said punching means, the conveyor belt and the bed being provided with holes through which a suction may be continuously applied to the underside of the web while the latter is in contact with said belt.

4. The apparatus of claim 3 including a suction pump and a manifold positioned and extending beneath the top surface of said flat bed and connected to the pump, the manifold and the bed being perforated, and the belt being also perforated, whereby, as the web lies on top of the belt, it is held thereto by the suction in the manifold.

5. The apparatus of claim 1 including means for manually adjusting the position of the sensing means with respect to the input side of the punching means, from a position adjacent the exit side of the punching means, thereby to adjust manually the positioning of the pattern within the punching means.

6. The apparatus of claim 1 in which the sensing means comprises:

a photoelectric light responsive cell and circuit therefor having an electrical output variable in accordance with the intensity of light reaching the cell;

a light source positioned to illuminate the portion of the web in which the registration marks sequentially appear with respect to said cell, the marks varying the intensity of light reaching the cell from the web;

drive means for the second conveying means operative to drive the latter at one intensity of light reaching said cell, but not at another; and said second control means being switching means timed by said punching means and governing the control of the photoelectric cell and circuit, so that the latter is operable to stop motion of said second conveying means only when each mark and a portion of the web just ahead of the mark are within the view of the cell, said circuit being rendered inoperable by the switching means to stop motion of the web when other portions of the latter are within the view of the cell.

7. The apparatus of claim 1 in which said third conveying means comprise a first and second conveying belt, the first belt lying adjacent the exit side of the punching means and receiving therefrom the severed tiles while still surrounded by the framework of scrap web, and the second belt being mounted above the first belt with its end being spaced away from the exit side of the punching means but in a position to receive thereon only said framework of scrap web.

8. The apparatus of claim 6 in which said switching means is operated by a moving part of the punching means.

9. The apparatus of claim 1 including:

means on said roll means for providing a second registration mark on the web in a constant predetermined lateral relationship to said pattern; and a second sensing means positioned near said input side and in a position to receive a signal from said second registration mark, the second sensing means being actuable by the second mark to move the second conveying means laterally in opposite directions with respect to the punching means, thereby to control the lateral position of the web and its pattern with respect to the punching means.

10. The apparatus of claim 9 in which the signal received by the second sensing means causes a null output from the latter when the second mark is so positioned with respect to the punching means that the pattern is in registration therewith, and causes a corrective output from the second control means to effect proper registration movement of the second conveying means when said second mark is so positioned that correct registration is not being effectuated.

11. The apparatus of claim 1 in which said roll means is rotatable and has a configured surface, the latter being adapted to engage one surface of the web for imposing thereon said pattern; and in which the total length of material punched from the web by one cycle of the punching means and the length of the repetitive pattern along the web are so related that one is a whole multiple of the other; the distance between said registration marks being substantially equal to said total length of material punched.

12. The apparatus of claim 11 in which the length about the roll of said configured surface is substantially equal to said total length.

References Cited

UNITED STATES PATENTS

| 1,754,502 | 4/1930  | Denmire. |
| 2,047,221 | 7/1936  | Pechy. |
| 2,130,700 | 9/1938  | Shackleton _____ 83—236 |
| 2,849,066 | 8/1958  | Michelet et al. ____ 83—262 XR |
| 3,237,973 | 3/1966  | Rumberger _____ 53—51 XR |
| 3,240,851 | 3/1966  | Scalora. |
| 3,244,779 | 4/1966  | Levey et al. |
| 3,329,995 | 7/1967  | O'Brien et al. |
| 3,350,744 | 11/1967 | Sederlund et al. |

WILLIAM J. STEPHENSON, Primary Examiner

U.S. Cl. X.R.

18—2, 19; 83—236, 262